US010706852B2

(12) United States Patent
Kumar et al.

(10) Patent No.: US 10,706,852 B2
(45) Date of Patent: Jul. 7, 2020

(54) CONFIDENCE FEATURES FOR AUTOMATED SPEECH RECOGNITION ARBITRATION

(71) Applicant: Microsoft Technology Licensing, LLC, Redmond, WA (US)

(72) Inventors: Kshitiz Kumar, Redmond, WA (US); Hosam Khalil, Redmond, WA (US); Yifan Gong, Sammamish, WA (US); Ziad Al-Bawab, San Jose, CA (US); Chaojun Liu, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 575 days.

(21) Appl. No.: 14/941,058

(22) Filed: Nov. 13, 2015

(65) Prior Publication Data
US 2017/0140759 A1 May 18, 2017

(51) Int. Cl.
*G10L 15/32* (2013.01)
*G10L 15/30* (2013.01)
*G10L 15/183* (2013.01)

(52) U.S. Cl.
CPC .............. *G10L 15/32* (2013.01); *G10L 15/30* (2013.01); *G10L 15/183* (2013.01)

(58) Field of Classification Search
None
See application file for complete search history.

(56) References Cited

U.S. PATENT DOCUMENTS

| 5,677,991 | A | 10/1997 | Hsu et al. |
| 5,794,196 | A | 8/1998 | Yegnanarayanan et al. |
| 5,822,729 | A | 10/1998 | Glass |
| 6,021,387 | A | 2/2000 | Mozer et al. |
| RE38,101 | E | 4/2003 | Vysotsky et al. |
| 6,542,866 | B1 * | 4/2003 | Jiang ...................... G10L 15/02 |
| | | | 704/240 |
| 6,735,562 | B1 | 5/2004 | Zhang et al. |
| 7,062,440 | B2 | 6/2006 | Brittan et al. |
| 7,177,808 | B2 | 2/2007 | Yantorno et al. |

(Continued)

OTHER PUBLICATIONS

McCourt, et al, "Multi-Resolution Cepstral Features for Phoneme Recognition Across Speech Sub-Bands," published May 12, 1998, in Proceedings on IEEE International Conference on Acoustics, Speech, and Signal Processing, vol. 1, 4 pages.

(Continued)

*Primary Examiner* — Abul K Azad
(74) *Attorney, Agent, or Firm* — Holzer Patel Drennan

(57) ABSTRACT

The described technology provides arbitration between speech recognition results generated by different automatic speech recognition (ASR) engines, such as ASR engines trained according to different language or acoustic models. The system includes an arbitrator that selects between a first speech recognition result representing an acoustic utterance as transcribed by a first ASR engine and a second speech recognition result representing the acoustic utterance as transcribed by a second ASR engine. This selection is based on a set of confidence features that is initially used by the first ASR engine or the second ASR engine to generate the first and second speech recognition results.

22 Claims, 4 Drawing Sheets

(56) References Cited

U.S. PATENT DOCUMENTS

| | | | |
|---|---|---|---|
| 7,228,275 B1* | 6/2007 | Endo | G10L 15/32 704/231 |
| 7,664,642 B2 | 2/2010 | Espy-Wilson et al. | |
| 7,756,700 B2 | 7/2010 | Rose et al. | |
| 7,822,603 B1 | 10/2010 | Parthasarathy et al. | |
| 7,933,777 B2 | 4/2011 | Koll | |
| 8,005,668 B2 | 8/2011 | Arun | |
| 8,239,203 B2 | 8/2012 | Stubley et al. | |
| 8,401,851 B2 | 3/2013 | Bushey et al. | |
| 8,639,508 B2 | 1/2014 | Zhao et al. | |
| 8,793,130 B2 | 7/2014 | Wang et al. | |
| 2002/0184030 A1 | 12/2002 | Brittan et al. | |
| 2004/0204930 A1 | 10/2004 | Chang et al. | |
| 2005/0015251 A1 | 1/2005 | Pi et al. | |
| 2005/0055209 A1 | 3/2005 | Epstein et al. | |
| 2006/0200347 A1 | 9/2006 | Kim et al. | |
| 2006/0293886 A1 | 12/2006 | Odell et al. | |
| 2007/0088552 A1 | 4/2007 | Olsen | |
| 2008/0195389 A1 | 8/2008 | Zhang et al. | |
| 2008/0270135 A1 | 10/2008 | Goel et al. | |
| 2010/0198598 A1 | 8/2010 | Herbig et al. | |
| 2010/0250250 A1 | 9/2010 | Wiggs | |
| 2011/0144986 A1 | 6/2011 | Yu et al. | |
| 2011/0144990 A1 | 6/2011 | Hoory et al. | |
| 2011/0166855 A1 | 7/2011 | Vermeulen et al. | |
| 2013/0041669 A1 | 2/2013 | Ben-David et al. | |
| 2013/0275135 A1 | 10/2013 | Morales et al. | |
| 2013/0289996 A1 | 10/2013 | Fry | |
| 2013/0325473 A1 | 12/2013 | Larcher et al. | |
| 2014/0244257 A1 | 8/2014 | Colibro et al. | |
| 2015/0019219 A1 | 1/2015 | Tzirkel-Hancock et al. | |
| 2015/0046163 A1 | 2/2015 | Levit et al. | |
| 2015/0301796 A1 | 10/2015 | Visser et al. | |
| 2015/0364131 A1 | 12/2015 | Hakkani-Tur | |

OTHER PUBLICATIONS

Kirchhoff, "Integrating Articulatory Features into Acoustic Models for Speech Recognition," published May 2000, in Proceedings of the Workshop on Phonetics and Phonology in ASR, 14 pages.

Hazen, et al, "A Comparison and Combination of Methods for OOV Word Detection and Word Confidence Scoring," published May 7, 2001, in Proceeding on IEEE International Conference on Acoustics, Speech, and Signal Processing, vol. 1, 4 pages.

Miyajima, et al, "A New Approach to Designing a Feature Extractor in Speaker Identification Based on Discriminative Feature Extraction," published Oct. 2001, in Proceedings of Speech Communication, vol. 35, No. 3-4, 16 pages.

Torre, et al., "Histogram Equalization of the Speech Representation for Robust Speech Recognition", in Proceedings of IEEE Transactions on Speech and Audio Processing, Oct. 10, 2001, 19 Pages.

Sankar, et al., "Automatic Confidence Score Mapping for Adapted Speech Recognition Systems", in Proceedings of IEEE International Conference on Acoustics, Speech, and Signal Processing, vol. 1, May 13, 2002, 4 Pages.

Fu, et al, "Combination of Multiple Predictors to Improve Confidence Measure Bawed on Local Posterior Probabilities," published Mar. 18, 2005, in Proceeding of IEEE International Conference on Acoustics, Speech and Signal Processing, vol. 1, 4 pages.

McDermott, et al., "Discriminative Training for Large-Vocabulary Speech Recognition Using Minimum Classification Error," published Jan. 2007, in Proceeding of IEEE Transactions on Audio, Speech, and Language Processing, vol. 15, Issue 1, 21 pages.

Lin, et al., "Cluster-based Polynomial-Fit Histogram Equalization (CPHEQ) for Robust Speech Recognition", in Proceedings of 8th Annual Conference of the International Speech Communication Association, Aug. 27, 2007, pp. 1054-1057.

Gollan, et al., "Confidence Scores for Acoustic Model Adaptation", in Proceeding of IEEE International Conference on Acoustics, Speech and Signal Processing, Mar. 31, 2008, pp. 4289-4292.

Lee, et al, "Unsupervised Feature Learning for Audio Classification Using Convolutional Deep Belief Networks," published Dec. 7, 2009, in Proceedings of Advances in Neural Information Processing Systems, 9 pages.

Ketabdar, H, et al, "Enhanced Phone Posteriors for Improving Speech Recognition Systems," published Aug. 16, 2010, in Proceeding of IEEE Transactions on Audio, Speech, and Language Processing, vol. 18, Issue 6, abstract only.

Fayolle, et al, "CRF-based Combination of Contextual Features to Improve a Posteriori Word-level Confidence Measures" published Sep. 26, 2010, in Proceeding of 11th International Conference on Speech Communication and Technologies, 4 pages.

Dahl, et al, "Context-Dependent Pre-Trained Deep Neural Networks for Large-Vocabulary Speech Recognition," published Jan. 2012, in Proceeding of IEEE Transactions on Audio, Speech, and Language Processing, vol. 20, Issue 1, 13 pages.

Huang, et al, "Predicting Speech Recognition Confidence Using Deep Learning with Word Identity and Score Features," published May 26, 2013, in Proceeding of IEEE International Conference on Acoustics, Speech and Signal Processing, 5 pages.

Kumar, et al., "Automatic Speech Recognition Confidence Classifier", U.S. Appl. No. 14/852,083, filed Sep. 9, 2015, 29 pages.

* cited by examiner

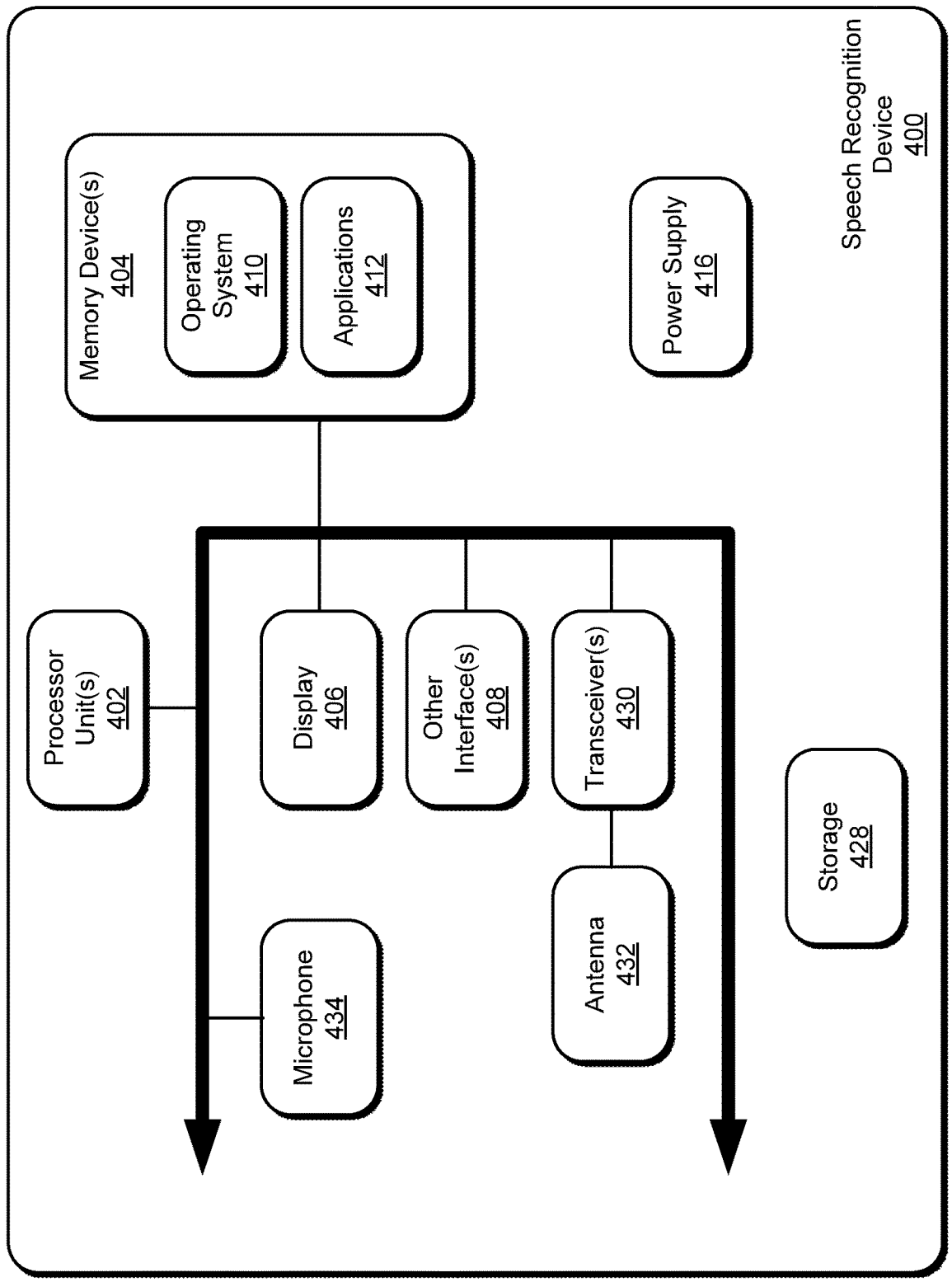

CONFIDENCE FEATURES FOR AUTOMATED SPEECH RECOGNITION ARBITRATION

BACKGROUND

An automated speech recognition (ASR) engine may use one or more acoustic models and language models to perform text transcriptions from speech data received from an audio source (e.g., a human speaker). Determining whether the ASR engine has correctly transcribed speech can be based on one or more acceptance metrics. In some technologies, multiple speech recognition engines are simultaneously employed to decode the same speech based on different language models and/or acoustic models. Since the different ASR engines may output different speech recognition results (e.g., transcribed speech), arbitration is sometimes employed to select the most accurate speech recognition result from among available results generated by different ASR engines.

In some technologies, arbitration is performed based on a 'confidence score' that quantifies a degree of confidence (e.g., expected accuracy) that an ASR engine has in its speech recognition results. However, confidence scores offer limited information and cannot be easily compared when provided by different ASR engines employing different language or acoustic modeling. Therefore, better techniques are desired for comparing speech recognition results from different ASR systems.

SUMMARY

The described technology provides arbitration between speech recognition results generated by different automatic speech recognition (ASR) engines, such as ASR engines trained according to different language or acoustic models. An arbitrator in an ASR system is configured to select between a first speech recognition result representing an acoustic utterance as transcribed by a first ASR engine (e.g., a client-based ASR engine) and a second speech recognition result representing the same acoustic utterance as transcribed by a second ASR engine (e.g., a service-based ASR engine). This selection is based on a set of confidence features that describe the acoustic utterance and are used in initially generating one or both of the speech recognition results.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

FIG. 4 illustrates an example schematic of a speech recognition device suitable for performing speech recognition detection or ASR arbitration according to the herein described technology.

DETAILED DESCRIPTIONS

An automated speech recognition (ASR) engine is generally trained over a set of confidence-features to maximally discriminate between correct and incorrect recognitions of spoken speech according to one or more language models (LMs) and/or acoustic models (AMs). Confidence-features are features that quantify some acoustic, literary, and/or syntactical aspect of spoken speech that may provide a basis for distinguishing words of the spoken speech from other words and sounds in a vocabulary.

Some ASR engines decode spoken speech into recognized text and generate a confidence score quantifying a likelihood that the recognized text accurately represents the spoken speech. Confidence scores are one helpful indicator in assessing ASR engine accuracy and are, in some technologies, passed from ASR engines to downstream entities tasked with selecting a "best result" from between speech recognition results from multiple different ASR engines. For example, some technologies utilize two or more separate ASR engines employing different language models and/or acoustic models to simultaneous decode speech based on the confidence features, thereby producing multiple speech recognition results. In such cases, various arbitration processes may be employed to select the best available speech recognition result from the multiple results. In these technologies, arbitration success is limited to inferences pertaining exclusively to the confidence score, which is itself computed from a pre-trained confidence classifier. The confidence classifier is pre-trained based on a number of confidence features. The herein disclosed technology provides systems and methods for arbitration that utilizes confidence features in addition to or in lieu of confidence scores, thereby facilitating access to richer data during arbitration and increasing arbitration success. Although the examples provided herein primarily contemplate arbitration between two ASR engines, the disclosed technology may also be suitable for arbitrating speech recognition results generated by three or more ASR engines.

Figure 1:
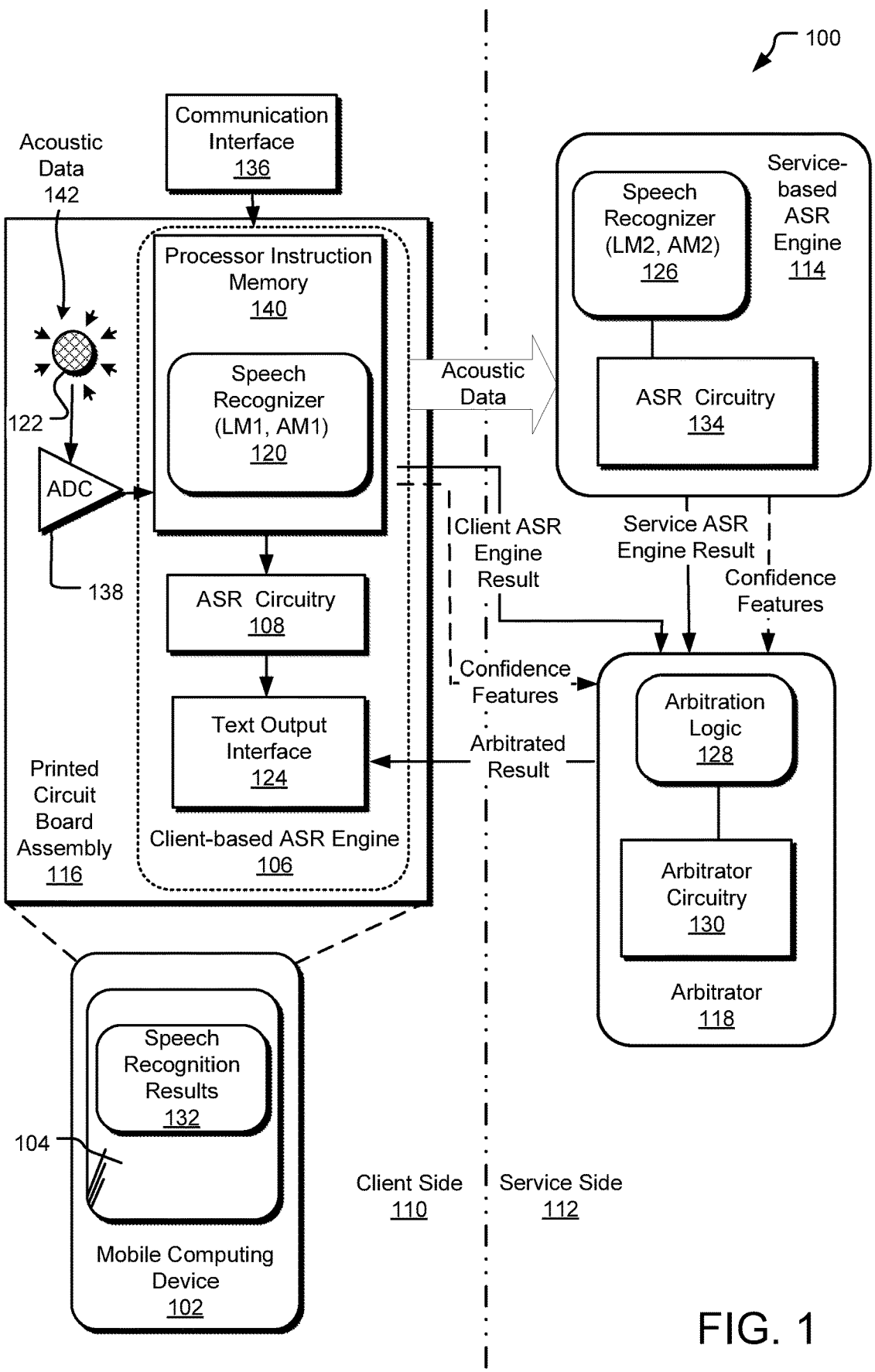
FIG. 1 illustrates an example speech recognition system that performs arbitration between results of different ASR engines based on confidence features describing a detected acoustic utterance.

FIG. 1 illustrates an example speech recognition system 100 that performs arbitration between speech recognition results of different ASR engines based on confidence features describing a detected acoustic utterance. A mobile computing device 102 (an example speech recognition device) includes a display 104 and a printed circuit board assembly 116. The printed circuit board assembly 116 is connected to an audio input device (e.g., microphone 122), which receives acoustic data 142 (e.g., "speech" or "acoustic utterances") and transfers the associated analog signals through an analog-to-digital converter (ADC) 138 to a first ASR engine, shown as a client-based ASR engine 106. Various hardware and/or software components of the client-based ASR 106 are integrated into a client side 110 as opposed to a service-side 112 of the system 100. In FIG. 1, the service-side 112 includes hardware and software for a second ASR engine and an arbitrator 118 (discussed in greater detail below). The second ASR engine is shown as a service-based ASR engine 114; however, the client-based ASR engine 106 and the service-based ASR engine 114 are merely examples of suitable ASR engines. Other implementations of the disclosed technology may utilize two ASR engines that are not distributed on a client-based side and service-based side of a system. For example, the disclosed technology may provide for arbitration between two ASR engines integrated into a same electronic device.

The client-based ASR engine 106 includes ASR circuitry 108 mounted on the printed circuit board assembly 116. The ASR circuitry 108 is under control of processor instructions stored in a processor instruction memory 140, including a speech recognizer 120 for decoding speech according to at least one acoustic model (AM1) and at least one language model (LM1) (e.g., grammar data, speech data, and various confidence features pertaining thereto).

Responsive to detection of an acoustic utterance including acoustic data 142, the ASR circuitry 108 transmits the acoustic data 142 to the service-based ASR engine 114, and the client-based ASR engine 106, and the service-based ASR engine 114 begins work to simultaneously decode the acoustic utterance according to the language and acoustic models of each respective engine. In another implementation, the service-based ASR engine 114 decodes the acoustic utterance at another time asynchronous to the decoding of the same acoustic utterance by the client-based ASR engine 106.

Like the client-based ASR engine 106, the service-based ASR engine 114 includes ASR circuitry 134 under control of processor instructions including a speech recognizer 126. The speech recognizer 126 decodes speech according to at least one language model (LM2) and at least one acoustic model (AM2). Notably, the language models and/or acoustic models utilized by the service-based ASR engine 114 may be different than the language models and/or acoustic models utilized by the client-based ASR engine 106. Consequently, the client-based ASR engine 106 may be better suited than the service-based ASR engine 114 for a select group of speech recognition scenarios. For example, a language model of the client-based ASR engine 106 may be trained according to terminology for mobile device usage such as "call", "digit dialing", "text", "open applications", etc. In contrast, a language model of the service-based ASR engine 114 may be trained according to a broader vocabulary well-suited general for general web-based inquiries (e.g., "weather", "voice queries", etc.).

During decoding of the acoustic data 142, the client-based ASR engine 106 and the service-based ASR engine 114 (collectively, the "ASR engines") each compare the acoustic data 142 to a number of potential results according to instructions of the speech recognizers 120, 126. For each potential result, the ASR engines compute a number of different metrics, herein referred to as "confidence features," that each quantifies some auditory, linguistic or syntactical aspect of the utterance compared to the potential result. For example, a confidence feature may be an acoustic arc score (described below) that is re-computed several times to compare the same acoustic utterance to each of thousands of potential speech recognition results.

Examples categories of various confidence features are listed below, without limitation:

Acoustic-model features—features computed in relation to an acoustic model, such as an aggregated per-frame acoustic score over a word or utterance or an acoustic arc score. For example, an acoustic arc score is an acoustic-model feature that measures potential for speech or silence between two words.

Language-model features—features computed in relation to a language model. For example, "fanout" is a language-model feature that measures of a number of outgoing connections from one word to another word within a particular language model. Another example of a language-module feature is "perplexity," which measures how well the language model can predict a sequence of words.

Noise and silence-model features—features computed in relation to noise and silence models.

Duration features—features computed relating to time and length, such as word-duration, number of words in a phrase, etc.

In some implementations, the speech recognizers 120, 126 each further instruct the associated circuitry (e.g., the ASR circuitry 108 and the ASR circuitry 134, respectively) to compute a confidence score which can be used in selection of a speech recognition result from the potential results. For example, the confidence score is computed from a confidence classifier that is trained from the confidence features to maximally discriminate correct and incorrect recognitions. In this sense, the confidence score is computed based on the computed confidence features (e.g., those on which the classifier is trained) and according to parameters of the associated acoustic models and language models. The confidence classifier may be, for example, a multilayer-perceptron or a deep neural network. In other implementations, the speech recognizers 120, 126 instruct the associated circuitry to compute metrics in lieu of or addition to the confidence score, such as acoustic and language model scores. This additional metrics may be used to select a speech recognition result from the potential results.

Confidence classifiers of the client-based ASR engine 106 and the service-based ASR engine 114 accept as input a number of potential speech recognition results to generate confidence scores and output a 'best' speech recognition result (e.g., recognized speech representing the acoustic data 142). For example, the 'best' speech recognition result is selected based on the calculated confidence score and/or based on an aggregate of acoustic and language model scores. In FIG. 1, these 'best' speech recognition results are labeled 'client ASR engine result' and 'service ASR engine result' respectively. Both the client ASR engine result and the service ASR engine result are input into the arbitrator 118, which includes arbitration circuitry 130 under the control of processor instructions further including arbitration logic 128 stored in a memory device (not shown). Inputs to the arbitrator 118 also include the computed confidence features derived by the ASR engines in association with the 'best' speech recognition result chosen by each ASR engine. In other words, the computed confidence features passed to the arbitrator 118 are those originally derived via a comparison of the acoustic data 142 to the potential result that was ultimately selected by the confidence classifier as the 'best speech recognition result.'

Confidence-features are inherently normalized, so unlike confidence scores, confidence features do not vary significantly when computed according to different models (AMs, LMs). Accordingly, the arbitrator 118 receives the computed confidence features from the client-based ASR engine 106 and the service-based ASR engine 114 that can readily be compared to one another.

In one implementation, the arbitration logic 128 is trained on a rich dataset that correlates values of individual confidence feature with success and failure scenarios of the client-based ASR engine 106 and the service-based ASR engine 114. This logic allows for probability distribution analysis of both the client-based ASR engine 106 and the service-based ASR engine 114 in specific relation to the range of values assumed by each of the individual confidence features. In another implementation, the arbitration logic 128 performs a probability distribution analysis based on combinations of confidence features and observed confidence feature values. For example, the arbitration logic 128 may utilize a neural network or other complex classifier that makes use of a vector (or several vectors) of confidence features combined.

The arbitration logic 128 instructs the arbitrator circuitry 130 to select an "arbitration result" from between the 'client ASR engine result' and the 'service ASR engine result' based on the confidence features received in association with one or both of these results. The arbitrator 118 returns this arbitration result to a text output interface 124 of the client-based ASR engine 106, which in turn presents the arbitration result on the display 104 in the form of speech recognition results 132.

In some implementations, the client-based ASR engine 106 and/or the service-based ASR engine 114 may additionally provide the arbitrator 118 with a calculated confidence score for use during arbitration. In such cases, arbitration is based on the confidence features in combination with the confidence score(s). Unlike confidence features, confidence scores may be language specific, as they may be individually trained across a set of AMs, LMs, languages, datasets, etc. Therefore, any software updates to the client-based ASR engine 106 and/or the service-based ASR engine 114 may entail 'retraining' of the arbitrator 118 or confidence score normalization if the confidence scores are used in arbitration.

The speech recognizers 120, 126 and/or the associated language models and acoustic models (e.g., LM1, AM1, LM2, AM2) can be updated via a communications interface 136 (e.g., a network connection, a Universal Serial Bus (USB) port, etc.). Acceptance metrics and other thresholds and parameters are also stored in memory and can be used to define recognition acceptance conditions and mapping functionality.

Figure 2:
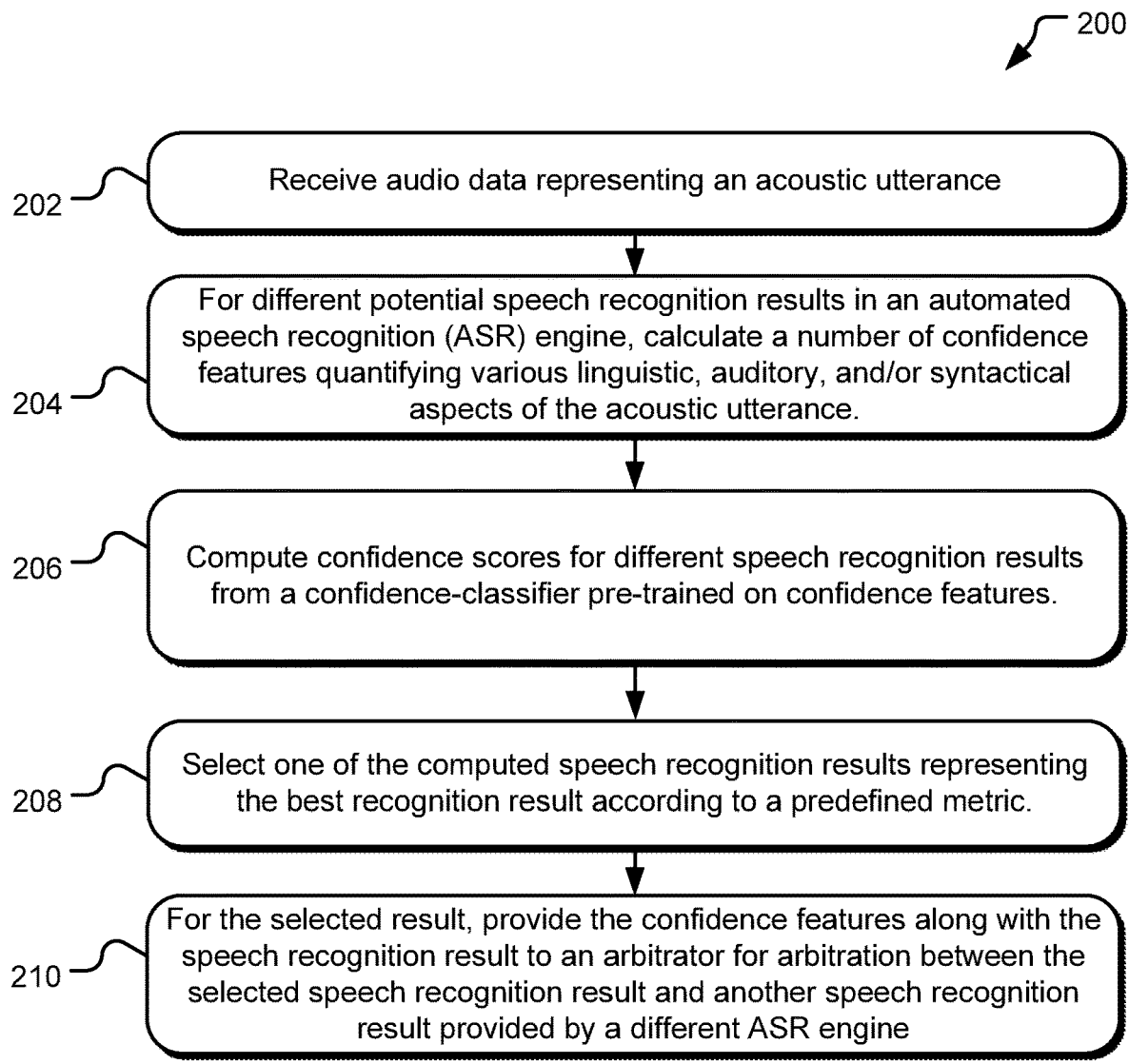
FIG. 2 illustrates example operations for initiating ASR arbitration based on confidence features describing a detected acoustic utterance.

FIG. 2 illustrates example operations 200 for initiating ASR arbitration based on confidence features describing a detected acoustic utterance. In one implementation, the example operations 200 are executed by hardware and/or software embodied in an electronic device, such as a mobile phone, gaming system, smart watch, navigation system, etc.

A receiving operation 202 receives audio data representing an acoustic utterance detected by a microphone of the electronic device. A calculation operation 204 calculates values for each of a number of different confidence features. The computed confidence features are each based on a comparison of the acoustic utterance to a potential speech recognition result. For example, the calculation operation 204 calculates a number of values for a first confidence feature (e.g., a first metric), where each computed confidence feature is based on a comparison between the acoustic utterance and a different one of multiple potential speech recognition results generated by an ASR engine. Thus, the first confidence feature serves as one metric by which to compare the acoustic utterance to each of the different potential speech recognition results.

A confidence scoring operation 206 computes confidence scores for different potential speech recognition results (e.g., transcriptions) of the acoustic utterances based on a confidence-classifier pre-trained on confidence features.

A selection operation 208 selects one of the computed speech recognition results representing the 'best' speech recognition result according to some predefined metric of the associated ASR engine. For example, the selected speech recognition result may correspond to a predefined metric including the highest aggregate of acoustic and language model scores, or to the highest confidence score. A providing operation 210 provides the selected speech recognition result along with the associated computed confidence features to an arbitrator for arbitration between the selected speech recognition result and another speech recognition result provided by a different ASR engine, such as a different ASR engine employing one or more different acoustic or language models. In some (but not all) implementations, the providing operation 210 provides the arbitrator with the confidence score associated with the 'best' speech recognition result in addition to the computed confidence features used to generate the confidence score.

Figure 3:
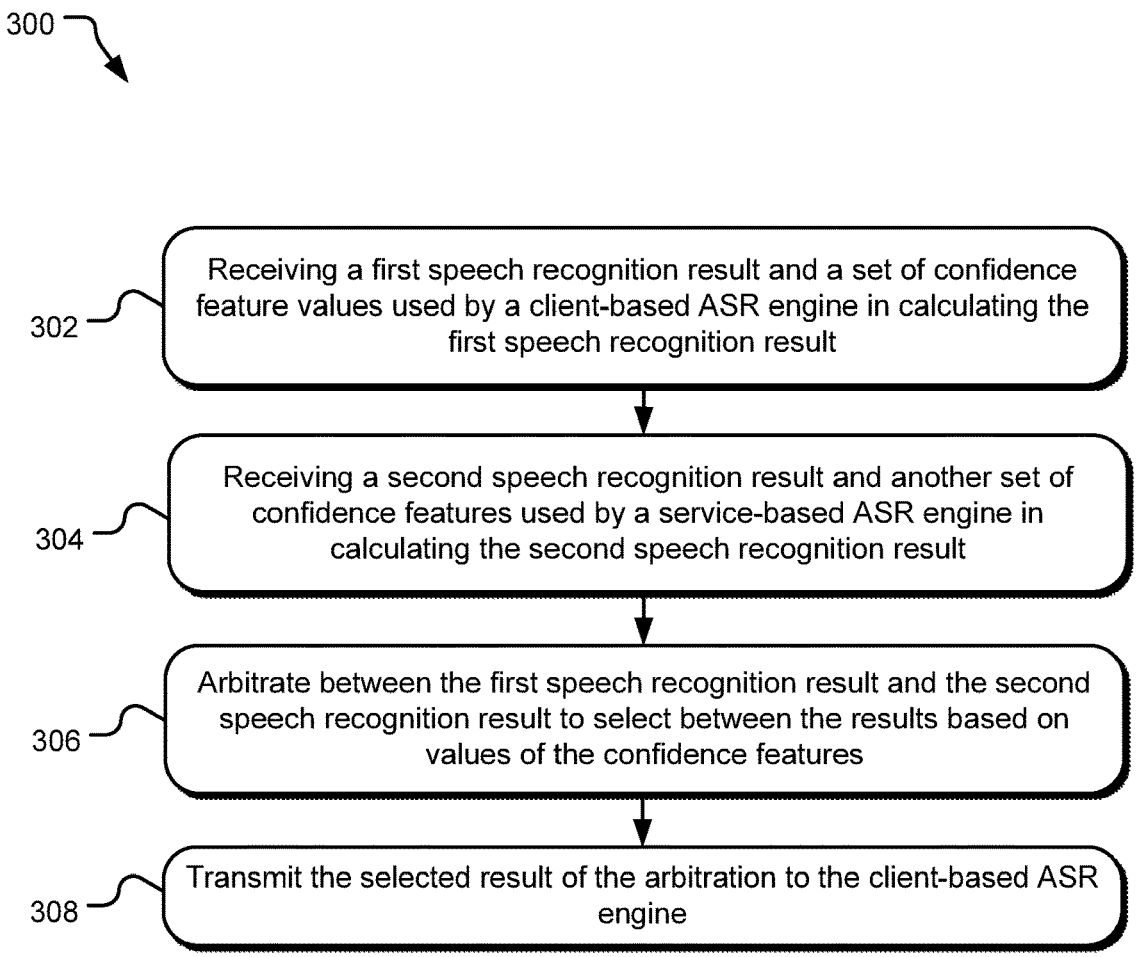
FIG. 3 illustrates example operations for performing ASR arbitration based on confidence features describing a detected acoustic utterance.

FIG. 3 illustrates example operations 300 for performing ASR arbitration based on confidence features describing a detected acoustic utterance. A receiving operation 302 receives a first speech recognition result and a set of confidence features used initially by a client-based ASR engine in calculating the first speech recognition result.

Another receiving operation 304 receives a second speech recognition result and set of confidence features used by a service-based ASR engine in calculating the second speech recognition result. In another implementation, the confidence features are received from one of (but not both) of the client-based ASR engine and the service-based ASR engine.

An arbitration operation 306 arbitrates between the first and second speech recognition results to determine which of the two speech recognition results is more likely to be accurate. In one implementation, this arbitration is based on an arbitration-classifier trained by a rich dataset including millions of acoustic utterances. Each utterance in the dataset is stored in memory in association with values of corresponding baseline-arbitration-features, confidence features and also in association with an identifier designating a "better-performing" ASR engine. The baseline-arbitration-features include information about domain and intent of the utterance, along with a number of higher-level features derived from the recognition result. The better-performing ASR engine is either the client-based ASR engine or the service-based ASR engine, and is selected based on whichever of the two ASR engines performed better in decoding the utterance during an initial test.

This rich dataset allows for a probability distribution analysis quantifying speech recognition accuracy for both the client-based ASR engine and the service-based ASR engine across a range of individual values that may be assumed by each of the individual confidence features. For example, logic used in arbitration may determine that a particular confidence feature value is associated with a 40% success rate according to the client-based ASR engine and a 90% success rate according to the service-based ASR engine. These respective success rates may change for different values of the same confidence feature, and these success rates can similarly be calculated in relation to a range of potential values for any of the many different confidence features received from the client-based ASR engine and/or the service-based ASR engine. Further metrics can be derived from this dataset and these statistics to additionally influence arbitration. In still other implementations, arbitration logic may utilize more complex logic that makes statistical assessments based on combinations of confidence features, such as a neural network.

The arbitration operation 306 selects an arbitration result from between the first recognition result and the second recognition result based on the received confidence features and the datasets used to train the arbitration model, as described above. A transmission operation 308 transmits the selected arbitration result back to the client-based ASR engine.

FIG. 4 illustrates an example schematic of a computing device 400 suitable for performing speech recognition detection or ASR arbitration according to the herein described technology. The example computing device 400 includes one or more processor units 402, one or more memory devices 404, a display 406 (e.g., a touchscreen display or lights, a hardcopy output device such as a printer), and other interfaces 408 (e.g., buttons). The memory 404 generally includes both volatile memory (e.g., RAM) and non-volatile memory (e.g., flash memory). An operating system 410, such as the Microsoft Windows® operating system, the Microsoft Windows® Phone operating system or a specific operating system designed for a gaming device, resides in the memory 404 and is executed by the processor unit(s) 402, although it should be understood that other operating systems may be employed.

One or more applications 412, such as arbitration logic, speech recognizer, and programs to support ASR circuitry and arbitration circuitry, are loaded in the memory device 404 and executed on the operating system 410 by the processor(s) 402.

The example computing device 400 includes a power supply 416, which is powered by one or more batteries or other power sources and which provides power to other components of the computing device 400. The power supply 416 may also be connected to an external power source that overrides or recharges the built-in batteries or other power sources.

The computing device 400 includes one or more communication transceivers 430 and an antenna 432 to provide network connectivity (e.g., a mobile phone network, Wi-Fi®, BlueTooth®, etc.). The computing device 400 may also include various other components, such as a positioning system (e.g., a global positioning satellite transceiver), one or more accelerometers, one or more cameras, an audio interface (e.g., a microphone 434, an audio amplifier and speaker and/or audio jack), and additional storage 428. Other configurations may also be employed.

In an example implementation, a mobile operating system, various applications (including a speech recognizer, arbitrator, and various programs to support ASR circuitry and arbitrator circuitry) and other modules and services may be embodied by instructions stored in memory 404 and/or storage devices 428 and processed by the processing unit(s) 402. Acoustic models, a corpus, acceptance metrics, confidence scores, received acoustic utterances, recognized/accepted text, and other data may be stored in memory 504 and/or storage devices 408 as persistent datastores.

The computing device 400 may include a variety of tangible computer-readable storage media and intangible computer-readable communication signals. Tangible computer-readable storage can be embodied by any available media that can be accessed by the speech recognition device 400 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the speech recognition device 400. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

An example speech recognition system includes a first automated speech recognition (ASR) engine, a second ASR engine, at least one memory device, and at least one processing device. The speech recognition system further includes an arbitrator stored in the at least one memory device and executable by the at least one processing device. The arbitrator is configured to receive a set of confidence features and to select between a first speech recognition results representing an acoustic utterance as transcribed by the client-based ASR engine and a second speech recognition result representing the acoustic utterance as transcribed by the service-based ASR engine based based on the received set of confidence features.

In another example system of any preceding system, the arbitrator is trained on datasets correlating confidence features with success and failure scenarios of the first ASR engine and the second ASR engine.

In another example system of any preceding system, the first ASR engine decodes the acoustic utterance based on a first acoustic model and a first language model and the second ASR engine decodes the acoustic utterance based on a second acoustic model and a second language model.

In still another example system of any preceding system, the arbitrator further selects between the first speech recognition result and the second speech recognition result based on a first confidence score computed by the first ASR engine and a second confidence score computed by the second ASR engine.

In another example system of any preceding system, the arbitrator is configured to select between the first speech recognition result and the second speech recognition result based on a first set of confidence features generated by the first ASR engine and a second set of confidence features generated by the second ASR engine.

In yet another system of any preceding system, the confidence features include at least one of acoustic model features or language-model features.

In another example system of any preceding system, the first ASR engine includes a speech recognizer that implements a confidence classifier trained on the confidence features.

An example arbitration method selects between a first automated speech recognition (ASR) result and a second ASR result. The method includes receiving from a first ASR engine a set of confidence features and an associated first speech recognition result representing an acoustic utterance selected from a plurality of potential results based on analysis of the set of confidence features. Additionally, the method includes receiving from a second ASR engine a second speech recognition result representing the acoustic utterance, and selecting between the first speech recognition result and the second speech recognition result based on one or more of the confidence features.

In another method of any preceding method, the speech recognition result is derived by a confidence classifier trained on a dataset including the confidence features to maximally discriminate between correct and incorrect definitions.

In another method of any preceding method, the first ASR engine decodes the acoustic utterance based on a first acoustic model and a first language model and the second ASR engine decodes the acoustic utterance based on a second acoustic model and a second language model.

Another method of any preceding method further comprises receiving from the second ASR engine another set of confidence features used in generating the second first speech recognition result.

In yet another method of any preceding method, the first ASR engine is executed by a processor on a client device and the method includes transmitting the selected result to a client device.

Another method of any preceding method further comprises receiving a confidence score from each of the first ASR engine and the second ASR engine.

In another method of any preceding method, the first speech recognition result and the second speech recognition result are received at an arbitrator and the method further includes training the arbitrator on datasets correlating confidence features with success and failure scenarios of the first ASR engine and the second ASR engine.

In yet another method of any preceding method, the confidence features include acoustic model features. In another method of any preceding method, the confidence features include language-model features.

An example system for arbitrating between a first automated speech recognition (ASR) result and a second ASR result includes means for receiving from a first ASR engine a set of confidence features an associated first speech recognition result representing an acoustic utterance selected from a plurality of potential results based on analysis of the set of confidence features. The example system further comprises means for receiving from a second ASR engine a second speech recognition result representing the acoustic utterance and means for selecting between the first speech recognition result and the second speech recognition result based on one or more of the confidence features.

An example method of arbitrating to select between a first speech recognition result and a second speech recognition result includes transmitting a set of confidence features and the first speech recognition result to an arbitrator and receiving, from the arbitrator, an arbitrated result selected based on the set of confidence features. The arbitrated result represents either the first speech recognition result, which is originally transcribed by a first ASR engine or the second speech recognition, which is originally transcribed by a second ASR engine. The first speech recognition result represents an acoustic utterance as transcribed by the first ASR engine and selected from a plurality of potential results based on analysis of the set of confidence features.

An example method of any preceding method further includes computing the confidence features based on the acoustic utterance and computing a confidence score to select the speech recognition result by maximally discriminating between correct and incorrect recognitions of the acoustic utterance.

In another example method of any preceding method, the confidence features include at least one of acoustic-model features and language-model features.

An example system for arbitrating to select between a first speech recognition result and a second speech recognition result includes means for transmitting a set of confidence features and the first speech recognition result to an arbitrator and means for receiving, from the arbitrator, an arbitrated result. The arbitrated result represents either the first speech recognition result, which is transcribed by a first ASR engine or the second speech recognition, which is transcribed by a second ASR engine. The first speech recognition result represents an acoustic utterance as transcribed by the first ASR engine and selected from a plurality of potential results based on analysis of the set of confidence features. The arbitrated result is selected based on the set of confidence features.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A speech recognition system for transforming an acoustic utterance into a transcribed speech recognition result by arbitrating between speech recognition results generated by a first automated speech recognition (ASR) engine and a second ASR engine, the system comprising:
at least one memory device;
at least one processing device;
an arbitrator stored in the at least one memory device and executable by the at least one processing device, the arbitrator configured to receive a set of confidence features of an utterance and to select between a first speech recognition result representing the acoustic utterance as transcribed by the first ASR engine and a second speech recognition result representing the acoustic utterance as transcribed by the second ASR engine, the selection being based on the received set of confidence features.

2. The system of claim 1, wherein the arbitrator is trained on datasets correlating confidence features with success and failure scenarios of the first ASR engine and the second ASR engine.

3. The system of claim 1, wherein the first ASR engine decodes the acoustic utterance based on a first acoustic model and a first language model and the second ASR engine decodes the acoustic utterance based on a second acoustic model and a second language model.

4. The system of claim 1, wherein the arbitrator further selects between the first speech recognition result and the second speech recognition result based on a first confidence score computed by the first ASR engine and a second confidence score computed by the second ASR engine.

5. The system of claim 1, wherein the arbitrator is configured to select between the first speech recognition result and the second speech recognition result based on a first set of confidence features generated by the first ASR engine and a second set of confidence features generated by the second ASR engine.

6. The system of claim 1, wherein the confidence features include acoustic model features.

7. The system of claim 1, wherein the confidence features include language-model features.

8. The system of claim 1, wherein the first ASR engine includes a speech recognizer that implements a confidence classifier trained on the confidence features.

9. A method of transforming an acoustic utterance into a transcribed speech recognition result by arbitrating to select between a first automated speech recognition (ASR) result and a second ASR result, the method comprising:
receiving from a first ASR engine a set of confidence features of an acoustic utterance and an associated first speech recognition result representing the acoustic utterance selected from a plurality of potential results based on analysis of the set of confidence features;
receiving from a second ASR engine a second speech recognition result representing the acoustic utterance; and
selecting between the first speech recognition result and the second speech recognition result based on one or more of the confidence features.

10. The method of claim 9, wherein the speech recognition result is derived by a confidence classifier trained on a dataset including the confidence features to maximally discriminate between correct and incorrect definitions.

11. The method of claim 9, wherein the first ASR engine decodes the acoustic utterance based on a first acoustic model and a first language model and the second ASR engine decodes the acoustic utterance based on a second acoustic model and a second language model.

12. The method of claim 9, further comprising:
receiving from the second ASR engine another set of confidence features used in generating the second first speech recognition result.

13. The method of claim 9, wherein the first ASR engine is executed by a processor on a client device and the method further comprises:
transmitting the selected result to a client device.

14. The method of claim 9, further comprising receiving a confidence score from each of the first ASR engine and the second ASR engine.

15. The method of claim 9, wherein the first speech recognition result and the second speech recognition result are received at an arbitrator and the method further comprises:
training the arbitrator on datasets correlating confidence features with success and failure scenarios of the first ASR engine and the second ASR engine.

16. The method of claim 9, wherein the confidence features include acoustic model features.

17. The method of claim 9, wherein the confidence features include language-model features.

18. A method of transforming an acoustic utterance into a transcribed speech recognition result by initiating arbitration to select between a first speech recognition result and a second speech recognition result, the method comprising:
transmitting a set of confidence features of an acoustic utterance and the first speech recognition result to an arbitrator, the first speech recognition result representing the acoustic utterance as transcribed by a first ASR engine selected from a plurality of potential results based on analysis of the set of confidence features; and
receiving, from the arbitrator, an arbitrated result representing the first speech recognition result transcribed by either the first ASR engine or the second speech recognition transcribed by a second ASR engine, the arbitrated result selected based on the set of confidence features.

19. The method of claim 18, further comprising:
computing the confidence features based on the acoustic utterance; and
computing a confidence score to select the speech recognition result by maximally discriminating between correct and incorrect recognitions of the acoustic utterance.

20. The method of claim 18, wherein the confidence features include at least one of acoustic-model features and language-model features.

21. The system of claim 1, wherein the confidence features are derived from the acoustic utterance.

22. The system of claim 1, wherein the confidence features each quantify an auditory, linguistic or syntactical aspect of the acoustic utterance.

* * * * *